US012743498B1

(12) United States Patent
Marili

(10) Patent No.: US 12,743,498 B1
(45) Date of Patent: Sep. 22, 2026

(54) UNIFIED NEURO-COGNITIVE SECURITY SYSTEM FOR HUMAN AND SYNTHETIC ENTITIES

(71) Applicant: Or Marili, Haifa (IL)

(72) Inventor: Or Marili, Haifa (IL)

( * ) Notice: Subject to any disclaimer, the term of this patent is extended or adjusted under 35 U.S.C. 154(b) by 0 days.

(21) Appl. No.: 19/331,682

(22) Filed: Sep. 17, 2025

Related U.S. Application Data

(63) Continuation-in-part of application No. 19/319,268, filed on Sep. 4, 2025, and a continuation-in-part of application No. 19/303,546, filed on Aug. 19, 2025, and a continuation-in-part of application No. 19/276,104, filed on Jul. 22, 2025.

(51) Int. Cl.

| | |
|---|---|
| ***G06F 21/00*** | (2013.01) |
| ***G06F 21/31*** | (2013.01) |
| ***G06N 20/00*** | (2019.01) |
| ***H04L 9/32*** | (2006.01) |

(52) U.S. Cl.
CPC ........... *G06F 21/316* (2013.01); *G06N 20/00* (2019.01); *H04L 9/3271* (2013.01)

(58) Field of Classification Search
CPC ...... G06F 21/316; G06N 20/00; H04L 9/3271
See application file for complete search history.

(56) References Cited

U.S. PATENT DOCUMENTS

| | | | | |
|---|---|---|---|---|
| 2012/0246737 | A1* | 9/2012 | Paxton | G06F 16/24578 726/27 |
| 2025/0285471 | A1* | 9/2025 | Sivakumar | G06V 10/82 |
| 2026/0065016 | A1* | 3/2026 | Fox | G06N 3/044 |
| 2026/0067314 | A1* | 3/2026 | Pell Reddy | H04L 63/1425 |

* cited by examiner

*Primary Examiner* — William A Corum, Jr.

(57) ABSTRACT

The present invention discloses a unified neuro-cognitive cybersecurity system designed to profile, monitor, and protect both human users and synthetic digital entities, including AI agents, bots, copilots, and orchestration scripts. The system captures fine-grained cognitive and behavioral telemetry—such as decision latency, interaction entropy, typing cadence, and response dynamics—to generate persistent neuro-cognitive profiles. A drift analysis engine continuously detects deviations from baseline behavior, even where adversaries operate with valid authentication credentials. A cross-entity attribution module maps anomalies to specific actors within multi-agent environments, enabling accurate identification of insider threats, impersonation attacks, and synthetic entity misuse. The system incorporates a reinforced adaptation layer recalibrates trust thresholds and mitigation strategies in real time. Mitigation actions include session suspension, access throttling, re-authentication, and quarantine. By extending cognitive identity assurance to both human and AI-driven participants, the invention establishes a comprehensive defense architecture against evolving identity-based threats in enterprise and critical infrastructure environments.

28 Claims, 6 Drawing Sheets

UNIFIED NEURO-COGNITIVE SECURITY SYSTEM FOR HUMAN AND SYNTHETIC ENTITIES

CROSS-REFERENCE TO RELATED APPLICATIONS

This application is a continuation-in-part of the following U.S. Non-Provisional Patent Applications:

1. "AI PROFILE SENTINEL—NEURO-COGNITIVE CYBERSECURITY SYSTEM" (application Ser. No. 19/276,104), filed Jul. 22, 2025.
2. "SMARTSTEALTH AGENT FOR SECURE COGNITIVE USER PROFILING IN CYBERSECURITY SYSTEMS" (application Ser. No. 19/303,546), filed Aug. 19, 2025.
3. "AUTONOMOUS SOC—NEURO-COGNITIVE SECURITY ORCHESTRATION AND RESPONSE SYSTEM" (application Ser. No. 19/319,268), filed Sep. 4, 2025.

FIELD OF THE INVENTION

The present invention relates to the field of cybersecurity, and more particularly to systems and methods for unified neuro-cognitive profiling, drift detection, and autonomous security response for both human users and AI-based digital entities, including but not limited to agents, bots, copilots, synthetic users, and autonomous decision-making systems.

BACKGROUND OF THE INVENTION

Existing cybersecurity systems are not equipped to analyze or verify identity based on cognitive behavioral traits, especially when dealing with non-human agents. Modern enterprise environments increasingly rely on AI-powered entities that perform autonomous actions. Conventional security approaches fail to detect misuse, impersonation, or drift in behavior from such synthetic entities, particularly when they operate under valid credentials or access tokens.

SUMMARY OF THE INVENTION

The present invention introduces a unified neuro-cognitive security architecture that performs behavioral profiling, deviation analysis, and adaptive response across both human and AI-based digital agents. The system generates persistent neuro-cognitive profiles for individual entities-whether biological or synthetic- and continuously monitors for deviations in cognitive patterns, interaction dynamics, and decision trajectories.

Key Components Include:

- A telemetry capture layer for both human and AI-driven entities, supporting endpoint-based, agentless, and hybrid modes.
- A cognitive fingerprint engine capable of profiling synthetic behaviors based on interaction logic, decision latency, and attention switching patterns.
- A real-time deviation scoring module that detects drift across sessions, environments, and contexts.
- A trust computation engine and mitigation policy layer that executes dynamic, explainable, and autonomous responses.
- A cross-entity attribution module that maps anomalies back to the responsible actor within multi-agent environments.

The system is deployable across cloud-native, on-premise, air-gapped, or federated enterprise architectures.

In Certain Embodiments, the System Includes:

- Explainable deviation APIs for SOAR/SIEM integration.
- A neuro-cognitive drift scoring engine usable as an identity factor.
- Behavior portability mapping to validate identity across devices and access sessions.

By introducing persistent cognitive identity assurance for both human and synthetic actors, the invention addresses a growing attack surface and enables real-time, context-aware, and autonomous security enforcement.

Unlike existing Zero Trust frameworks which enforce access control primarily at the perimeter or upon authentication, the present invention establishes a continuous behavioral trust validation mechanism rooted in neuro-cognitive profiling. This transforms Zero Trust from a static boundary model into a dynamic, adaptive identity assurance architecture applicable to both human and AI-based actors. As such, the invention provides a foundational upgrade to Zero Trust principles, enabling real-time verification of behavioral authenticity throughout the session lifecycle.

DETAILED DESCRIPTION OF THE INVENTION

In one embodiment, the system continuously monitors behavioral telemetry from both human-operated and AI-operated endpoints, generating individualized neuro-cognitive profiles based on data such as typing cadence, decision latency, cursor dynamics, API invocation patterns, and interaction consistency over time. The profiling engine is capable of handling high-resolution telemetry data in both agent-based and agentless deployment modes.

AI—based entities-including but not limited to autonomous software agents, LLM-powered copilots, bots, orchestration scripts, and API clients—are monitored using synthetic behavioral fingerprints. These profiles are derived from interaction structures, decision frequency, and operational entropy. The system treats these synthetic entities as profiled actors, enabling deviation detection, behavioral drift scoring, and identity assurance at the machine level.

A key capability is the detection of identity-based threats using valid credentials. In one embodiment, the system generates a neuro-cognitive profile for a legitimate user based on behavioral and cognitive interaction patterns. If an external attacker gains access to valid authentication credentials (e.g., via phishing, credential theft, or credential stuffing), the attacker may initially appear legitimate. However, by comparing the attacker's behavioral and cognitive data against the legitimate user's stored profile, the system identifies significant deviations and flags the activity as malicious—even if the authentication succeeded. In another embodiment, the system monitors the activity of an LLM-based copilot or other AI assistant integrated into enterprise workflows. For example, if the copilot initiates unauthorized API calls, generates commands outside its historical operational entropy, or demonstrates anomalous decision latency, the profiling engine identifies the deviation and enforces adaptive containment. This embodiment extends cognitive identity assurance to synthetic digital actors, preventing misuse or escalation of AI-driven entities operating within enterprise environments.

This model protects against both insider threats and external impersonation attacks. The system supports a multi-layered response strategy, including session lockdown, re-authentication challenges, risk-tier alerts, or temporary quarantine of the user profile or entity involved. In certain deployments, the mitigation policy engine integrates with identity and access management (IAM) and single sign-on (SSO) providers. In such cases, adaptive authentication challenges, step-up verification, or access tier downgrades are automatically enforced based on the computed drift score and trust evaluation. This integration enables seamless coordination between neuro-cognitive detection and existing enterprise access control frameworks.

The profiling engine further includes a cross-entity attribution module that operates in multi-agent environments. When anomalous behavior is detected within a collaborative system involving multiple humans and AI entities, the system attributes responsibility to the specific source—based on drift signature, entropy score, and interaction causality chain.

In addition, the invention introduces a Behavioral Portability Engine that verifies cognitive identity across devices and sessions, including transitions between cloud, BYOD, and virtualized environments. Profiles are dynamically adjusted for environmental context, access modality, and session type.

Reinforced Cognitive Identity Layer (RCIL) within Zero Trust Architecture: In a preferred embodiment, the system further operates as a Reinforced Cognitive Identity Layer (RCIL) embedded beneath traditional identity management systems. The RCIL provides continuous behavioral identity assurance throughout the access lifecycle, rather than relying solely on initial authentication events. Within Zero Trust Architecture (ZTA) environments, the RCIL acts as a Tier-0 security infrastructure layer, performing persistent trust validation on both human and synthetic actors—even when valid credentials or tokens are presented. The RCIL dynamically verifies cognitive and behavioral consistency using telemetry such as decision latency, entropy, input cadence, and attention switching, and triggers adaptive enforcement actions (e.g., session suspension, privilege throttling, or re-authentication) when deviation thresholds are exceeded. This real-time sub-identity verification layer ensures that access remains contextually valid and cognitively authentic, extending Zero Trust principles ("never trust, always verify") to behavioral fidelity. As a result, the invention enables enforcement of cognitive identity continuity across dynamic multi-agent enterprise environments, positioning the system as a foundational component in high-assurance security models.

Explainability is achieved through a built-in Interpretability Module that provides structured narrative justifications for detected anomalies. These justifications are accessible via secure APIs and can be integrated into SOC dashboards, audit logs, or external SOAR systems.

The invention also includes a Reinforced Adaptation Layer-a self-learning component based on reinforcement learning that continuously adjusts policy sensitivity, mitigation strategy, and trust thresholds based on historical outcome data, user feedback, and evolving context. In a preferred embodiment, the system is deployed in a hybrid enterprise environment that combines endpoint telemetry agents with agentless data acquisition via federated APIs. This hybrid configuration ensures continuous behavioral coverage in regulated or restricted infrastructures, while minimizing deployment friction. In certain embodiments, the system includes a stealth telemetry module deployed as a lightweight agent on endpoint devices. This module operates in passive or obfuscated mode, collecting high-resolution behavioral data—including micro-latency, keystroke dynamics, mouse path entropy, and contextual interaction traces—without disrupting user experience or triggering standard endpoint detection systems. In security-sensitive environments, the telemetry is encrypted end-to-end using AES-256 or equivalent cryptographic protocols, ensuring that behavioral data remains tamper-resistant and confidential during transmission to the profiling engine. The system also supports agentless telemetry acquisition via federated APIs or secure memory hooks for environments where agent deployment is restricted. Both modes—agent-based and agentless—operate under a unified behavioral fingerprinting protocol, enabling consistent profiling fidelity across deployment architectures. The preferred mode balances fidelity of endpoint-level cognitive telemetry with the scalability and compliance advantages of agentless collection, thereby providing optimal accuracy and operational resilience.

It is to be understood that specific embodiments described herein, including IAM/SSO integration, copilot monitoring, and hybrid deployment, are fully supported by and implemented through the existing modules illustrated in the accompanying figures. These embodiments do not require the introduction of new structural components but represent functional extensions of the profiled system architecture.

In a preferred deployment within a security operations center (SOC), the system integrates a policy engine that dynamically maps drift scores and cognitive trust indicators to predefined risk tiers. Based on the active trust tier, the system initiates adaptive responses such as alert prioritization, session throttling, command blocking, or real-time access modification. The policy engine continuously ingests incident feedback, operator actions, and behavioral telemetry to refine its response mappings through reinforcement learning. This closed feedback loop enables the system to autonomously evolve its mitigation strategies over time, optimizing both responsiveness and false-positive suppression. Integration with SOAR platforms allows for escalation paths and cross-system coordination, further enhancing containment in high-stakes environments.

In sum, the system enables real-time cognitive identity enforcement, behavioral drift detection, impersonation resistance, and adaptive mitigation for both human and synthetic digital actors across dynamic enterprise environments.

The technical details and operational mechanisms of the invention are described throughout this specification, including but not limited to the sections titled "System Architecture," "Functional Components," "RCIL within Zero Trust," "Use Cases," and the drawing legends. These sections are hereby incorporated by reference into this description for enablement and claim support purposes.

DETAILED DESCRIPTION OF THE DRAWINGS

Figure 1:
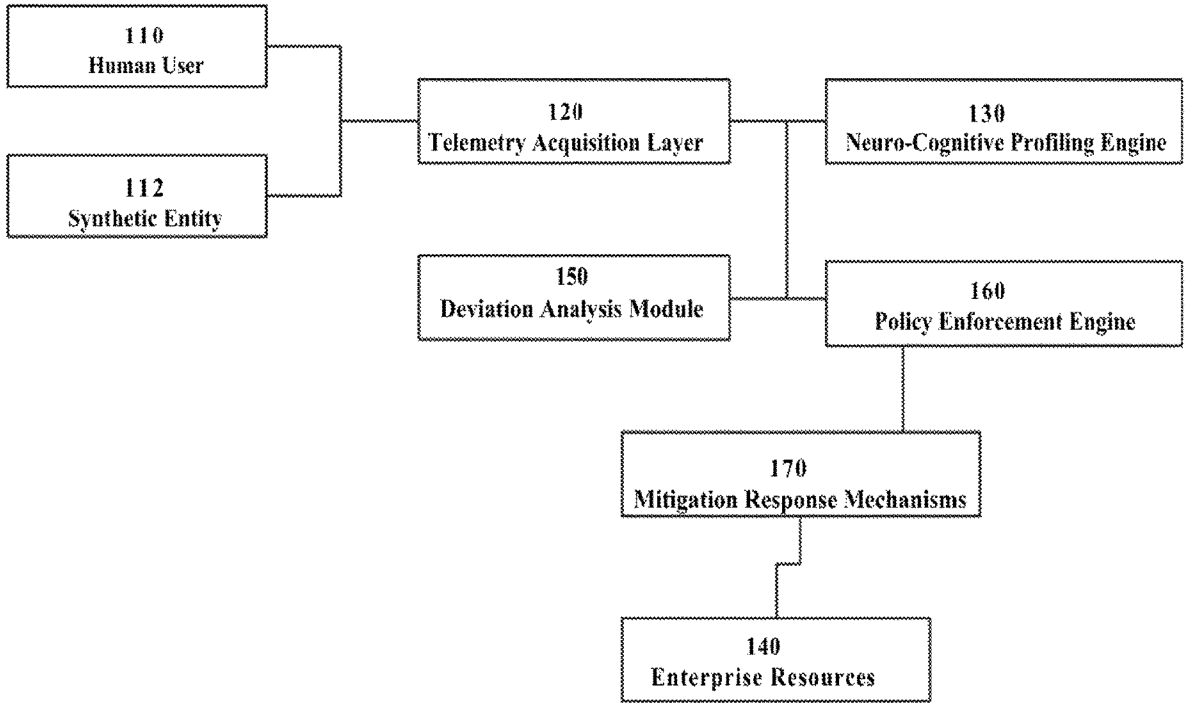
FIG. 1 is a block diagram illustrating the overall architecture of the neuro-cognitive security system, including human users, AI agents, telemetry collection modules, profiling engines, and response layers.

FIG. 1 depicts a unified security system comprising multiple modules. Human users (110) and synthetic entities (112)—including AI agents, bots, and copilots—interact with enterprise resources (140). Telemetry is captured by a hybrid data acquisition layer (120), then forwarded to a cognitive profiling engine (130). Outputs from the profiling engine feed into a deviation analysis module (150), which interacts with a policy enforcement engine (160) to trigger appropriate responses (170), including session lockdown, access adjustment, or alert generation.

Figure 2:
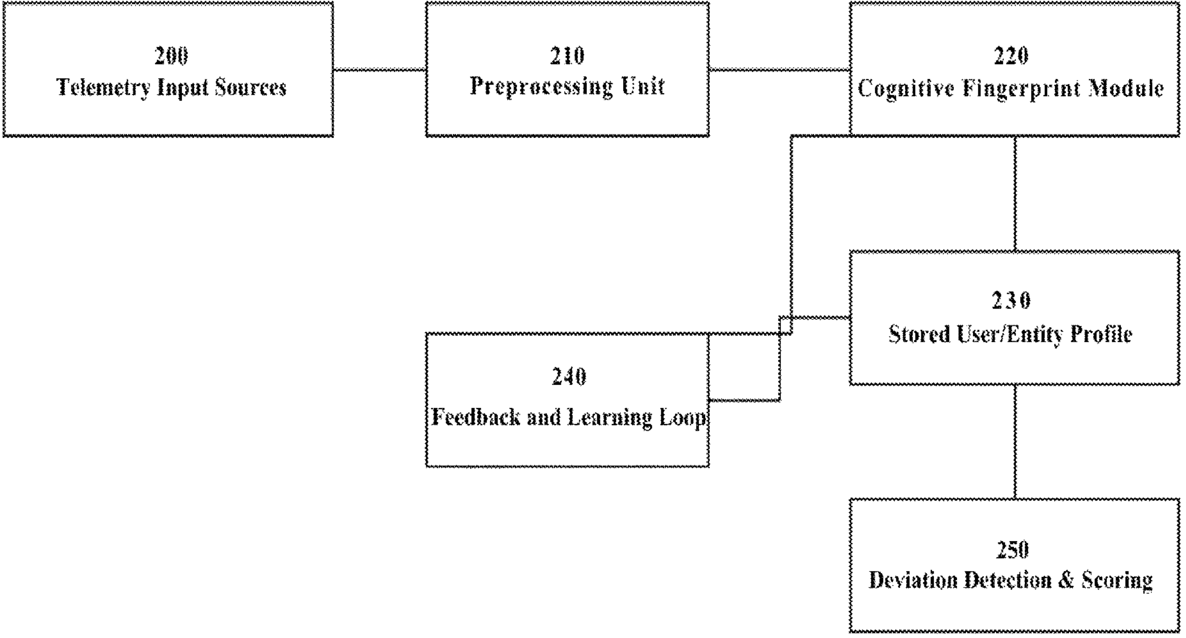
FIG. 2 is a flowchart showing the process of generating a neuro-cognitive profile from behavioral telemetry inputs and continuously updating it with new interaction data.

FIG. 2 presents the profiling process. Telemetry sources (200) capture fine-grained behavioral and cognitive signals. These inputs pass through a preprocessing unit (210) and are analyzed by the cognitive fingerprint module (220). The resulting profile (230) is stored and continuously updated by feedback loops (240) based on evolving behavioral context. A deviation detection and scoring module (250) analyzes monitored interaction data to identify cognitive or behavioral drift, assigning a quantifiable risk score used by downstream decision modules.

Figure 3:
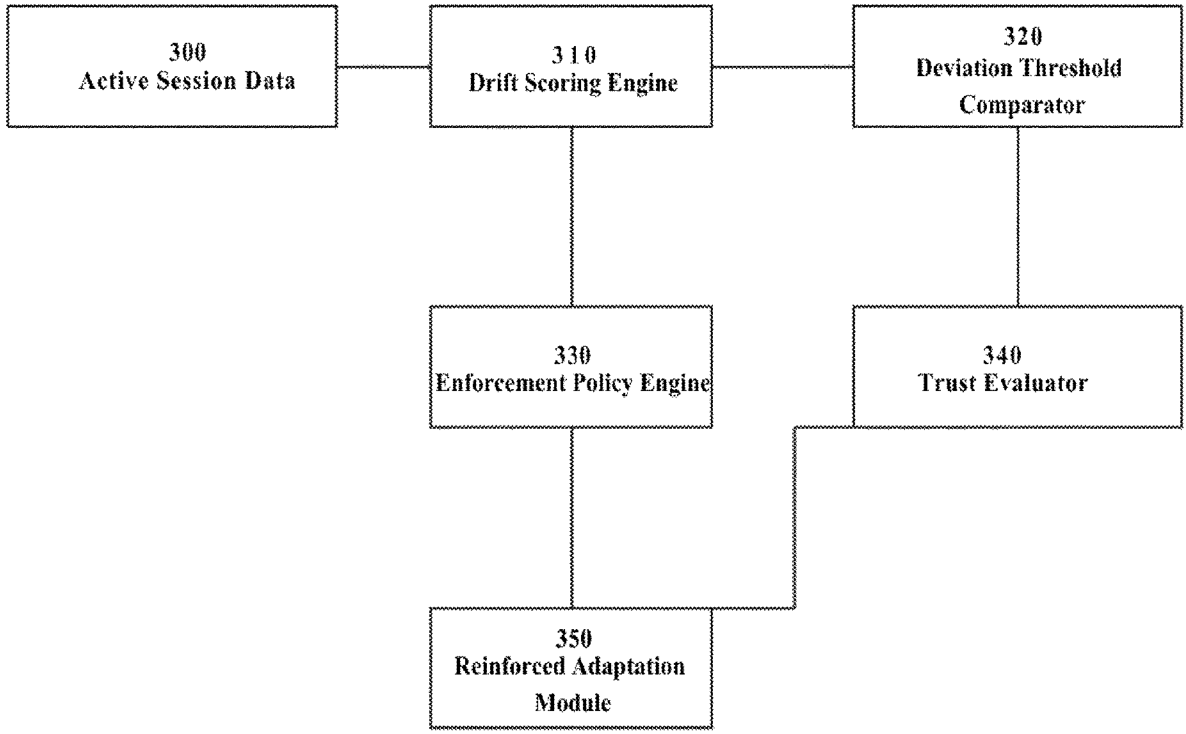
FIG. 3 is a diagram depicting real-time drift detection and the corresponding mitigation workflow, including deviation scoring, trust thresholds, and enforcement actions.

FIG. 3 illustrates drift detection and mitigation. Session data (300) is scored for deviation using a drift engine (310). If scores exceed defined thresholds (320), mitigation actions are initiated via a policy engine (330), optionally routed through a trust evaluator (340). Outcomes are recorded and can adjust future policy sensitivity via a reinforcement module (350).

Figure 4:
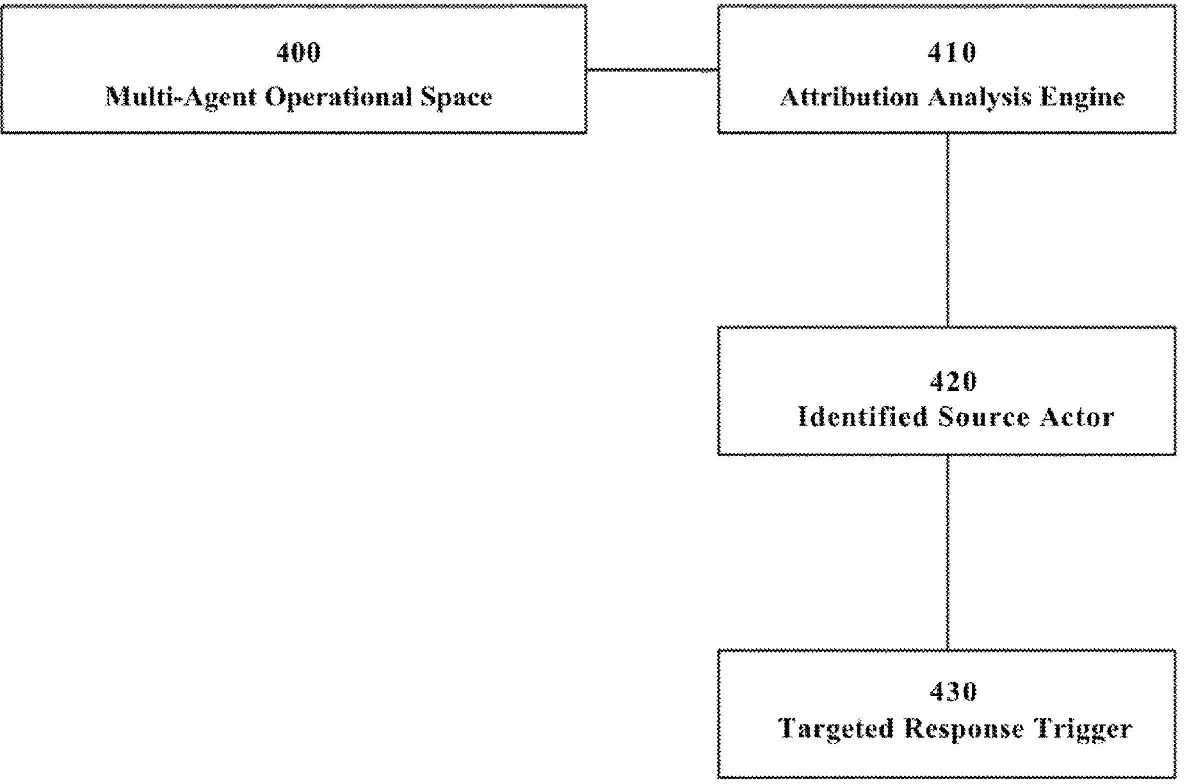
FIG. 4 illustrates a cross-entity attribution model that identifies the responsible actor (human or synthetic) based on anomaly causality and behavioral signature.

FIG. 4 demonstrates attribution within a multi-entity environment. Multiple users and agents (400) operate concurrently. When anomalous behavior is observed, an attribution engine (410) evaluates entropy patterns, causality chains, and actor fingerprints. It isolates the responsible entity (420), triggering entity-specific responses (430).

Figure 5:
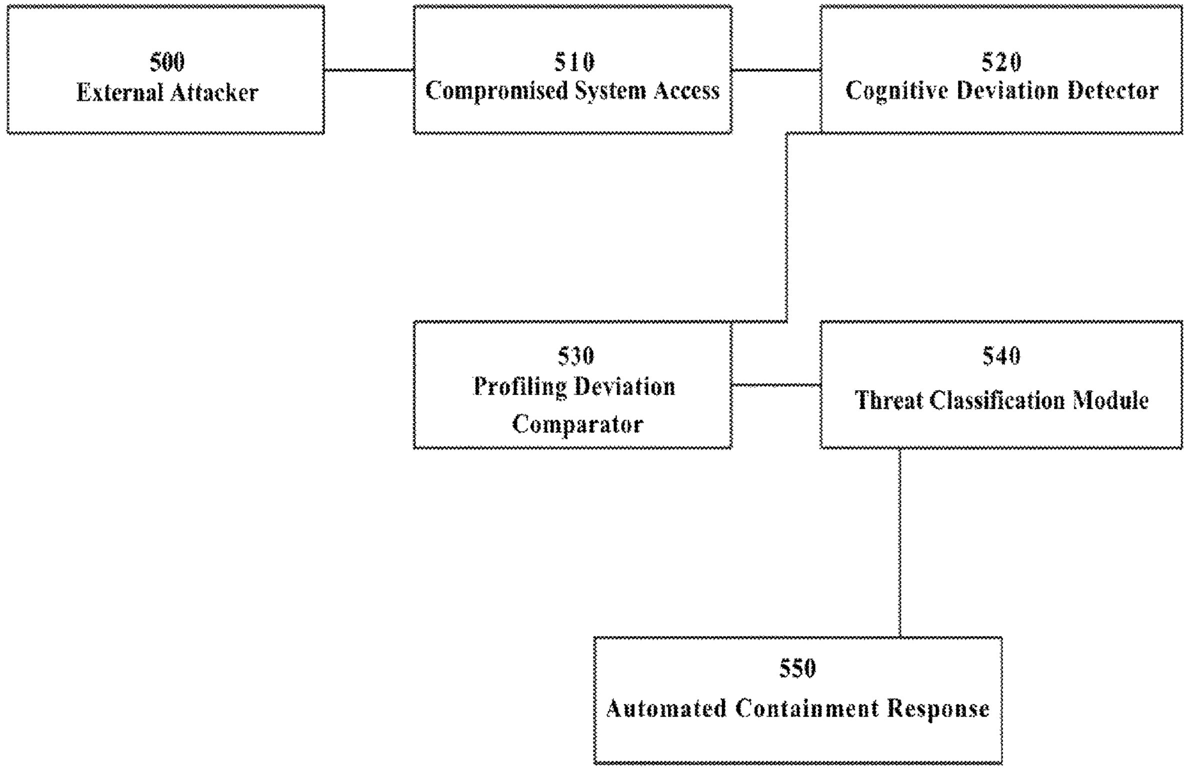
FIG. 5 shows a scenario involving an external adversary who gains access via stolen credentials and is detected by comparison to the legitimate user's neuro-cognitive profile.

FIG. 5 shows a breach scenario. An attacker (500) acquires valid credentials and accesses the system (510). While appearing legitimate to standard IAM systems, deviation from the expected neuro-cognitive profile (520) is detected by the profiling engine (530), resulting in classification as a threat (540) and automatic response execution (550).

Figure 6:
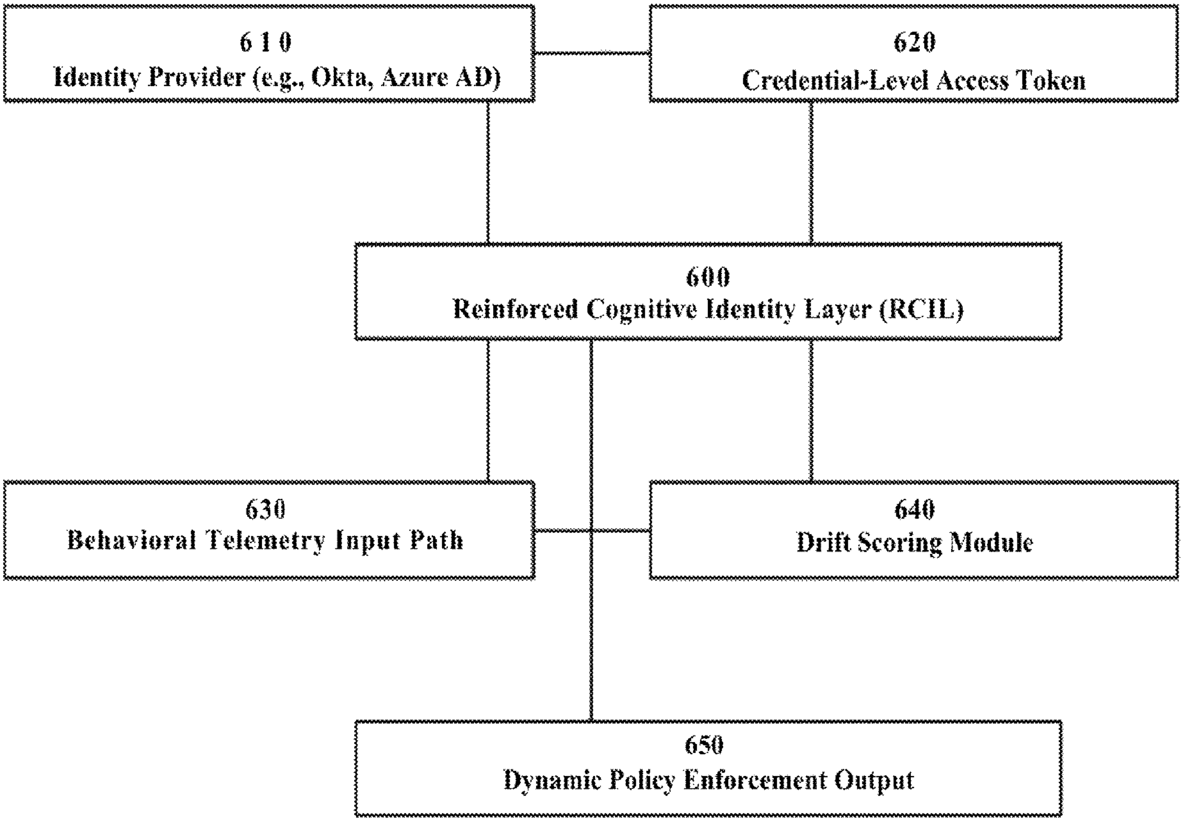
FIG. 6 illustrates the Reinforced Cognitive Identity Layer (RCIL) as a persistent sub-identity enforcement component integrated beneath identity providers within a Zero Trust Architecture stack.

FIG. 6 shows the integration of the Reinforced Cognitive Identity Layer (600) within a Zero Trust Architecture context. Identity providers such as Okta or Azure AD (610) authenticate entities based on credentials (620). The RCIL layer (600) performs continuous behavioral verification by evaluating telemetry streams (630) from human and synthetic actors, calculating drift scores (640), and dynamically enforcing access policies (650) based on the trust posture. The RCIL operates beneath static authentication, forming a Tier-0 trust enforcement mechanism that interacts with both access control systems and adaptive response modules.

ADVANTAGES OVER PRIOR ART

The present invention introduces a comprehensive and adaptive cognitive identity profiling system that fundamentally departs from traditional cybersecurity approaches such as rule-based anomaly detection, static behavioral baselines, or log-centric correlation engines. Unlike prior art systems that typically treat users as fixed identities with unchanging behavior, this invention enables the continuous creation and refinement of individualized neuro-cognitive profiles for both human users and synthetic digital entities.

Conventional user behavior analytics (UEBA) systems are heavily reliant on log aggregation and retrospective event analysis. In contrast, the present invention collects high-resolution behavioral telemetry in real-time, including interaction latency, cognitive entropy, attention switching, and decision-making patterns, without requiring kernel-level access or administrative privileges.

Moreover, prior endpoint security platforms (e.g., EDR solutions) focus on device-level anomalies or known malware signatures, whereas the disclosed invention operates at the identity-cognition layer, detecting adversaries-even those using valid credentials-based on behavioral and cognitive mismatch.

Importantly, no known system in the art provides the ability to profile and enforce trust policies on AI-driven agents, chatbots, large language model (LLM) copilots, or synthetic orchestration scripts. The claimed invention fills this critical gap by treating such entities as first-class actors with behavioral baselines and risk scores, enabling the system to respond to drift or impersonation attempts involving non-human actors.

Additionally, the system provides real-time attribution and adaptive enforcement based on dynamic behavioral context, cross-session continuity, and layered deviation scoring. These capabilities are absent in prior systems that operate with static policies or limited temporal scope.

Furthermore, the disclosed invention significantly reduces false positives and false negatives compared to conventional UEBA and endpoint detection platforms. By leveraging continuous cognitive baselines and reinforcement-driven adaptation, the system dynamically tunes thresholds to minimize unnecessary alerts while preserving high detection sensitivity.

Unlike prior art systems that struggle with high-throughput enterprise environments, the present invention is architected for scalability, maintaining real-time profiling and deviation detection across millions of interactions without performance degradation.

Critically, no existing framework provides a Reinforced Cognitive Identity Layer (RCIL) operating as a Tier-0 continuous assurance component beneath identity providers within a Zero Trust stack. This unique capability positions the system as a foundational enforcement mechanism, extending Zero Trust beyond static access control into persistent cognitive validation.

In sum, the present invention offers a novel, cognitive-first, agent-agnostic, and privacy-preserving architecture that significantly improves security fidelity, attacker detection precision, and trust enforcement in complex enterprise environments involving both human and synthetic actors.

Industrial Applicability/Utility

The disclosed invention has clear and substantial industrial applicability across multiple sectors that require advanced identity assurance and behavioral anomaly detection. The system may be deployed in enterprise cybersecurity operations, governmental networks, critical infrastructure environments, financial institutions, and any digital ecosystem where distinguishing between legitimate and malicious access is essential.

Its utility extends to both preventive and reactive cybersecurity strategies, providing real-time protection against insider threats, credential abuse, and AI-driven impersonation attacks. The system's modular architecture, including telemetry acquisition, neuro-cognitive profiling, and adaptive response mechanisms, allows integration with existing SOC workflows, SIEM platforms, identity providers (IdPs), and access management frameworks.

Furthermore, the invention is compatible with cloud-native, on-premises, and hybrid deployment models, and supports scalable telemetry pipelines for high-throughput environments. It offers operational value in reducing false positives, enabling continuous authentication, and augmenting traditional identity and access management (IAM) systems with cognitive context.

Given the accelerating adoption of synthetic agents, LLM-based copilots, and autonomous digital tools across enterprise environments, the disclosed system is uniquely positioned to deliver practical, high-impact protection against a new class of identity threats.

Accordingly, the invention satisfies the requirements of 35 U.S.C. § 101 by providing a specific, practical, and industrially applicable solution to known cybersecurity limitations.

Possible Variations and Embodiments

While the preceding specification and claims describe specific implementations of the disclosed system, it is understood that numerous variations and alternative embodiments may be adopted without departing from the scope and spirit of the invention.

In some embodiments, the telemetry acquisition layer may be implemented as an agentless sensor embedded within a browser, virtual desktop infrastructure (VDI), or thin client, rather than as a standalone endpoint agent. In other embodiments, telemetry signals may be ingested from federated or third-party sources such as identity providers (IdPs), identity threat detection platforms, or behavioral analytics services.

The neuro-cognitive profiling engine may utilize a variety of machine learning architectures, including rule-based heuristics, clustering techniques, deep learning models, or symbolic logic systems, depending on the deployment constraints and cognitive signal fidelity.

Synthetic entities profiled by the system may include a broad range of AI-powered tools such as large language model (LLM) copilots, API-integrated orchestration agents, autonomous remediation bots, synthetic user sessions, and decision-support assistants operating within zero-trust or SOAR ecosystems.

Mitigation strategies may also vary, ranging from passive alerting, adaptive throttling, or challenge-based reauthentication, to more active measures such as access tier downgrades, session isolation, or automated incident escalation via orchestration layers.

Attribution logic may include hybrid inference mechanisms based on behavioral signatures, causality graphs, operational entropy, or role-based context, and may support integration with external threat intelligence sources for contextual enrichment.

Moreover, the invention is not limited to enterprise environments. It may be applied in high-security government systems, operational technology (OT) networks, medical systems, or any digital ecosystem where distinguishing between trusted and anomalous actors-human or synthetic—is mission-critical.

Such flexibility enables the system to be tailored for varying risk postures, operational constraints, privacy policies, and infrastructure models.

Accordingly, the scope of the invention should not be limited to the particular examples provided but construed to include any implementation falling within the breadth of the claims.

Glossary of Terms

Synthetic Entity:

A non-human, AI-driven digital actor capable of interacting with systems, services, or users autonomously or semi-autonomously. This includes bots, LLM-based copilots, orchestration agents, autonomous remediation tools, and other algorithmic decision-making entities.

Neuro-Cognitive Profile:

A structured behavioral model representing a subject's cognitive interaction patterns, including timing, decision latency, entropy, focus shifts, and adaptive responses. Generated from telemetry signals and updated over time to reflect behavioral continuity and individual traits.

Telemetry Acquisition Layer:

The subsystem responsible for capturing behavioral signals from users or agents, such as keystroke dynamics, mouse behavior, attention switching, and session context, using endpoint-based or agentless mechanisms.

Drift Score:

A quantifiable metric indicating the degree of behavioral or cognitive deviation from a baseline neuro-cognitive profile. Used to trigger security responses when thresholds are exceeded.

Attribution Engine:

A module that determines the most likely source (human or synthetic) of an observed behavioral anomaly based on signal entropy, causality, profile deviation, and operational context.

Behavioral Entropy:

A measure of unpredictability or randomness in interaction patterns over time, used to distinguish natural cognitive behavior from scripted, synthetic, or adversarial activity.

Cognitive Fingerprint:

A unique signature derived from how an entity interacts with a system, including micro-interactions and decision flows, used for identification and anomaly detection.

Trust Evaluator:

A decision layer that assesses the current behavioral consistency and risk level of an entity based on deviation analysis, contextual awareness, and policy logic.

Mitigation Policy Engine:

The enforcement layer that determines and applies appropriate security actions-such as alerting, access throttling, session isolation, or adaptive authentication-based on deviation severity and attribution outcome.

Valid Credentials:

Authentication tokens or login details that would be accepted by a conventional IAM system, regardless of whether the entity using them is the legitimate user.

Cross-Entity Profiling:

The practice of modeling, analyzing, and comparing the behavioral patterns of multiple human and synthetic entities within the same environment to detect anomalies, drift, or impersonation.

SERIAL LEGEND FOR DRAWINGS

110—Human user

112—Synthetic entity (AI agent, bot, copilot)

120—Telemetry acquisition layer
130—Neuro-cognitive profiling engine
140—Enterprise resources
150—Deviation analysis module
160—Policy enforcement engine
170—Mitigation response mechanisms
200—Telemetry input sources
210—Preprocessing unit
220—Cognitive fingerprint module
230—Stored user/entity profile
240—Feedback and learning loop
250—Deviation detection and scoring module
300—Active session data
310—Drift scoring engine
320—Deviation threshold comparator
330—Enforcement policy engine
340—Trust evaluator
350—Reinforced adaptation module
400—Multi-agent operational space
410—Attribution analysis engine
420—Identified source actor
430—Targeted response trigger
500—External attacker
510—Compromised system access
520—Cognitive deviation detector
530—Profiling deviation comparator
540—Threat classification module
550—Automated containment response
600—Reinforced Cognitive Identity Layer (RCIL)
610—Identity provider (e.g., Okta, Azure AD)
620—Credential-level access token
630—Behavioral telemetry input path
640—Drift scoring module
650—Dynamic policy enforcement output

The invention claimed is:

1. A system for unified neuro-cognitive identity enforcement, comprising:

a telemetry acquisition layer configured to capture interaction signals from both human-operated devices and Artificial Intelligence (AI) based digital entities, including autonomous agents, Large Language Model (LLM) powered copilots, chatbots, orchestration scripts, and synthetic accounts;

a profiling engine configured to generate and maintain individualized neuro-cognitive profiles for said entities, incorporating behavioral and cognitive interaction patterns selected from decision latency, interaction entropy, typing cadence, attention switching, or response variability;

a drift analysis engine configured to detect deviations from a baseline profile, including deviations caused by entities operating with valid authentication credentials;

an attribution engine configured to identify a responsible actor within a multi-entity environment based on drift signatures and entropy analysis;

a policy enforcement engine configured to initiate mitigation actions including at least session suspension, re-authentication, access tier adjustment, or entity quarantine; and a reinforcement-driven adaptation engine module operatively coupled to the profiling engine and the policy enforcement engine, configured to recalibrate trust thresholds and mitigation strategies in real time based on historical outcomes and contextual feedback.

2. The system of claim 1, wherein the telemetry acquisition layer operates in both agent-based and agentless modes with encrypted, privacy-preserving instrumentation.

3. The system of claim 1, wherein the telemetry acquisition layer is configured to operate exclusively on synthetic digital entities, including orchestration agents, LLM-based copilots, or Application Programming Interface (API) driven bots, and wherein profiling, drift detection, and mitigation are performed without requiring interaction with any human-operated device.

4. The system of claim 1, wherein the attribution engine distinguishes between human actors and synthetic entities.

5. The system of claim 1, wherein the profiling engine supports both supervised and unsupervised learning for generating cognitive baselines.

6. The system of claim 1, wherein the adaptation module employs reinforcement learning reward functions to balance false positives and false negatives.

7. The system of claim 1, wherein the system further comprises an explainability module configured to produce structured narratives for detected anomalies.

8. The system of claim 1, wherein impersonation detection includes comparing temporal interaction signatures against historical patterns.

9. The system of claim 1, further comprising a Reinforced Cognitive Identity Layer (RCIL) configured as a Tier-0 enforcement layer within a Zero Trust architecture, the RCIL providing continuous behavioral identity assurance beneath identity providers (IdPs) by verifying neuro-cognitive consistency of both human and synthetic entities throughout an access session lifecycle.

10. The system of claim 1, wherein synthetic entity profiles are based on computational entropy, decision determinism, and invocation chain analysis.

11. The system of claim 1, further comprising a portability engine configured to align profiles across BYOD, cloud, and virtualized environments.

12. The system of claim 1, wherein a trust evaluator dynamically recalibrates trust thresholds based on organizational context.

13. The system of claim 1, wherein impersonation attempts are reported to a centralized threat intelligence system.

14. The system of claim 1, wherein deviation thresholds are modulated by a reinforced adaptation layer based on long-term efficacy.

15. A method of detecting and responding to identity-based threats, comprising:

generating a neuro-cognitive profile for a human or synthetic entity based on captured interaction signals including at least one of typing cadence, cursor micro-movements, decision latency, interaction entropy, or focus window sequences;

receiving activity data associated with the entity during an access session, including cases where the entity uses valid authentication credentials;

comparing the activity data to a stored neuro-cognitive profile to detect deviations exceeding a cognitive anomaly threshold;

attributing the deviations to a specific actor within a multi-agent environment;

computing a trust score for the entity;

initiating an automated mitigation response comprising at least access suspension, session isolation, throttling, or re-authentication;

updating the neuro-cognitive profile and trust thresholds through a reinforcement-based feedback loop;

wherein the deviations are weighted differently depending on whether the entity is human, hybrid, or synthetic; and wherein telemetry data includes the interaction entropy and the decision latency to distinguish synthetic from human actors.

16. The method of claim 15, further comprising storing anonymized telemetry in an immutable audit log.

17. The method of claim 15, further comprising attributing the deviations in multi-agent environments by analyzing entropy scores and causality chains.

18. The method of claim 15, wherein mitigation includes adaptive throttling of network access.

19. The method of claim 15, wherein the updating step incorporates reinforcement learning with reward matrices based on outcome validation.

20. The method of claim 15, wherein the neuro-cognitive profile is continuously refined with feedback from user corrections and downstream validation systems.

21. The method of claim 15, wherein the activity data is captured from endpoint devices, virtual desktops, browser sessions, or cloud-based access instances.

22. The method of claim 15, wherein the trust score influences authentication policies or response escalation.

23. The method of claim 15, wherein impersonation attempts using valid credentials are flagged as malicious deviations.

24. The method of claim 15, wherein cross-entity attribution is performed when anomalies are detected in collaborative environments with multiple humans and Artificial Intelligence (AI) agents.

25. The method of claim 15, wherein an explainability engine generates structured narratives describing detected anomalies in human-readable language.

26. The method of claim 15, wherein profiles are portable across different sessions and devices.

27. The method of claim 15, wherein a system applies challenge-based re-authentication in response to the detected deviations.

28. The method of claim 15, wherein the updating step applies long-term adaptive weighting of deviation factors to reduce overreaction and underreaction.

* * * * *